United States Patent [19]

Peckinpaugh

[11] Patent Number: 4,978,098

[45] Date of Patent: Dec. 18, 1990

[54] ADJUSTABLE SUPPORT

[76] Inventor: Roger Peckinpaugh, 24605 Wayman St., Santa Clarita, Calif. 91321

[21] Appl. No.: 401,981

[22] Filed: Sep. 1, 1989

[51] Int. Cl.⁵ ............................................. F16M 13/00
[52] U.S. Cl. .................................. 248/523; 248/188.7; 248/188.2
[58] Field of Search ............... 248/523, 524, 527, 529, 248/188.2, 188.7, 188.4; 47/40.5

[56] References Cited

U.S. PATENT DOCUMENTS

| | | | |
|---|---|---|---|
| 1,719,435 | 7/1979 | Cowther | 248/188.2 |
| 2,238,708 | 4/1941 | Russell | 248/188.7 |
| 2,283,324 | 5/1942 | Faser | 248/188.1 |
| 2,722,970 | 11/1955 | Steelmann | 248/188.2 |
| 3,021,921 | 2/1962 | Poelvoorde et al. | 182/201 |
| 3,142,464 | 7/1964 | Zelenitz | 248/523 X |
| 3,236,485 | 2/1966 | Staples | 248/188.7 X |
| 3,350,043 | 10/1967 | Apple | 248/523 X |
| 3,768,766 | 10/1973 | Bain | 248/188.2 |
| 4,036,462 | 7/1977 | Sleftel | 248/188.7 X |

FOREIGN PATENT DOCUMENTS

| | | | |
|---|---|---|---|
| 868500 | 1/1953 | Fed. Rep. of Germany | 248/188.2 |
| 557344 | 11/1943 | United Kingdom | 248/188.2 |

Primary Examiner—Alvin C. Chin-Shue
Attorney, Agent, or Firm—Charles Berman

[57] ABSTRACT

An adjustable support including a base formed by splayed legs has adjustable feet located about the perimeter of the legs. The feet are formed by transfers rods which interengage with a lever and spring mechanism inside hollow tube constituting the legs so as to permit for adjustment and interlocking of the feet in relatively different vertical positions relative to the legs.

4 Claims, 1 Drawing Sheet

ADJUSTABLE SUPPORT

BACKGROUND

This invention relates to an adjustable support. In particular the invention relates to a support for adjusting a location of ornamental trees such as Christmas trees.

Ornamental trees that are natural tend to be non-uniform in shape due to their natural growth environment. When such trees, for instance, Christmas trees, are cut and then located in a home there is considerable difficulty in locating the tree in an appropriate upright position. Conventionally a stand supports the tree. Prop means, often in the form of telephone books, and the like, are need to be located under the stand under one or more positions of the stand. This is in an effort to locate the tree in the appropriate upright position. Adjustment can be difficult until such time that the correctly sized prop means and position of the prop relative to the stand is determined.

It is accordingly an object of this invention to provide a support for a foundation means which overcomes the problems with the prior.

SUMMARY

According to the invention a support for a foundation means includes a base with at least one foot on the base. The foot is adjustable relative to the base thereby to vary the position of the leg and the foundation means.

Preferably the base is constituted by a plurality of spaced legs which radiate from a central location where the foundation means, which is a spike for the ornamental tree, is located.

The foot preferably is directed transversely in a generally upright direction relative to legs which are directed in a relatively horizontal direction. Interengaging biasing means in the form of a helical spring and pivoted lever interlock the foot adjustably with the legs.

The invention is further described with reference to the accompanying drawings.

DRAWINGS

DESCRIPTION

Figure 4:
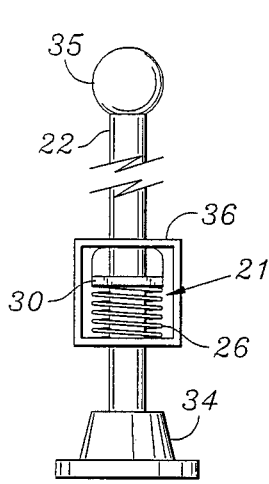
FIG. 4 is an end view of a leg, foot and adjustable means.
Figure 1:
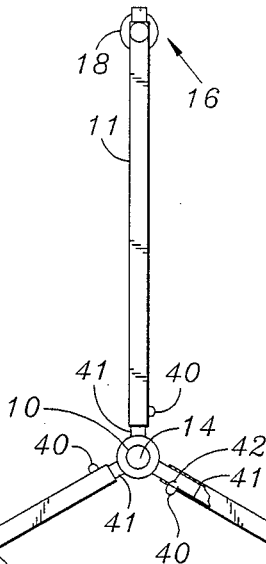
FIG. 1 is a plan elevational view showing three legs splayed apart from a central location.
Figure 5:
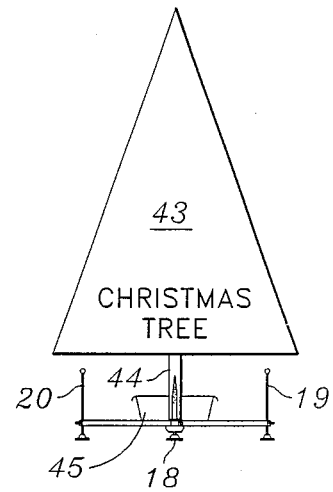
FIG. 5 is a side elevation illustrating interaction of the support with a Christmas tree in location on the foundation spike.

A support for a foundation means in the nature of a spike 10 includes a plurality of spaced legs 11, 12, and 13 which radiate from a center position 14.

At the remote ends 15, 16, and 17 of the legs there are respectively feet 18, 19 and 20. The feet include adjustment means generally indicated by numeral 21 whereby the position of the foundation means 10 can be effectively changed.

The adjustment means 21 for each of the feet 18, 19 and 20 include a transfer rod 22 which is passed through the right ends of the legs 11, 12 an 13 as indicated. The remote ends have apertures 23 and 24 formed in the walls 25 of the legs 11 so that they are located transversely and generally in a vertical direction through the legs 11, 12 and 13. The legs are generally directed in a horizontal line.

The legs 11, 12 and 13 are formed by a hollow tube. In each of the respective remote ends 15, 16 and 17 there is housed a biasing means 26 which is in the nature of a helical or flat spring located about the vertical rod 22. The one end of the helical spring engages the inner wall 27 of the tube 11 and the opposite end engages the surface 28 of an L-shaped lever 30.

Figure 3:
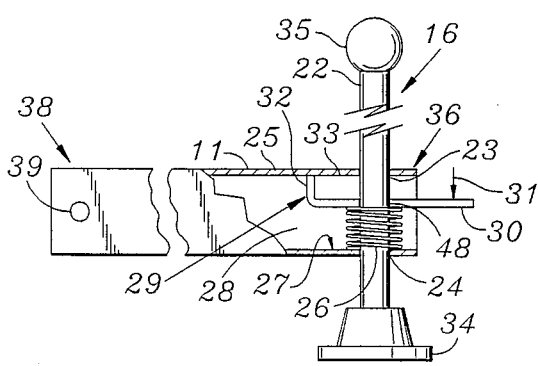
FIG. 3 is a detailed partially sectioned view the side of the leg, foot and adjustable means.

In this fashion as illustrated in FIG. 3 the lever 30 has a horizontally directed portion 30 which has been forced into the horizontal position by downward force as indicated by arrow 31. The free end 32 of the upwardly directed lever engages the top inside wall 33 of the tube 11.

The base of the feet have rubber pads or shoes 34 and the top has a rubber fitted stop 35. The shoe 34 facilitates the secure engagement on a floor or carpet without damaging the floor or carpet. The stop 35 ensures that there are no rough or sharp edges protruding from the feet or the support structure. With the lever bar 30 in the horizontal position, the rod 22 is relatively free to move upwardly and downwardly relative to the horizontal leg 11. When the pressure 31 is removed the spring 26 urges the lever 30 upwardly so that the edge of hole 48 binds on the front and back surface of leg 22 locking leg 22 in position. This is illustrated in the right hand side of FIG. 2 with regard to the leg 19. In this position the interengagement of the rod 22 with the lever 30 causes an effective locking of the foot 34 relative to the bar 12 apertures 23 and 24 retain rod 22 in an upright position.

At the end 38 of the leg 11 there is formed an aperture 39 which interengages with a protruding button 40 which is formed to protrude from spokes 41 directed from the central axis 14 of the foundation member 10. The buttons 40 have biasing spring means 42 located in the housing in the spokes 41 to urge their outward positioning from the spokes 41 so that positive interengagement with the legs 11, 12 and 13 is accomplished. Depression of the buttons 40 permits for the legs 11, 12 and 13 to be removed from the foundation member 13 and for the support to be collapsed.

Although the legs have been described as being generally horizontal situations could exist where the legs are obliquely directed relative the horizontal. In operation a tree 43 would be located with a stem 44 fitting about the spike 10. Also provided is a basin 45 which fits about the spike 10 and which is adapted to hold water so that the stem 44 can be seated in a bath of water. The tree 43 is relocated so that the spike 10 is fitted into the stem 44. The tree 43 may be relatively irregular. The spike 10 can be hammered into the stem 44 by force on the base 46 of the spike 10. The wall of the spike 10 is provided with serrations 47 to facilitate secure anchorage of the stem 44 with the spike 10. The basin is also located about the spike 10.

Figure 2:
FIG. 2 is a side view of the support illustrated in FIG. 1.

The legs 11, 12, and 13 are then secured to the spokes 41 and the tree 43 is uprighted so that the legs take a generally horizontal position as illustrated in FIG. 2. The tree itself may be in a irregular location relative to vertical and it may be necessary to adjust the feet 18, 19 and 20 as the case may be to locate the tree 43 vertically as designed. This is achieved by pushing on the tree 43 in one direction which may be in the direction between the legs 11 and 13. This would raise leg 12 from the floor. Pressure on the stop 35 pushing the rod 22 downwardly can then cause the location of the leg 12 with the foot 19 to protrude to a greater extent below the level of the leg 12 than the relative feet locations 18 and 20 with regard to legs 11 and 13 respectively. Release of a foot 19 so that it extends further upwardly relative to the leg 12 could be effected by pushing downwardly on lever 30 in a direction of arrow 31. The spring 26 and lever 28 are removed from their interlocking engagement with the bar 22 and the foot can be edged upwardly through the apertures 23 and 24 a totally different location is found. Different positions of the feet 18, 19, and 20 can be set up to secure the tree 43 in the desired position.

Although the invention has been described with reference to the accompanying drawings it should be appreciated that many modification exist each differing from the other and that is of detail only. For instance, although the foundation member has been described as a spike 10 for securing the tree, the system would work with the foundation member 10 being a support for an umbrella stand, table, pedestal or the like. Additionally, although the feet are indicated to be at the end of spaced legs, the legs may be constituted in a solid base about the central location 14. Also, although the spring and lever mechanism interengaging in the back of the leg 11 is the same model as the spring below the lever a different formation could be constituted whereby the spring is located above the lever. The invention provides a easy way for stabilizing, locating and levelling the foundation member relative to an outside surrounding so that the foundation member or an element located with the foundation member can be positioned as desired.

The scope of the invention is to be determined so that by the appended claims.

I claim:

1. A support for a foundation means to secure an ornamental tree including a plurality of radially spaced transversely directed legs, at least one foot for one of the legs, the foot being adjustable in height whereby the location of the leg is adjustable thereby to adjust the position of the foundation means, the foundation means including spike means for interengaging a tree wherein the adjustable foot includes a rod transversely directed relatively to the leg, interlocking means for permitting the engagement of the foot and the legs, the interlocking means including biasing means and a lever, and wherein the legs being an at least partly hollow section having a bottom wall at an end removed from the foundation means and wherein the biasing means is contained within the hollow section, the biasing means being a spring surrounding a portion of the foot extending through the hollow section, and the lever extending essentially in the same transverse direction as the spaced leg and being accommodated at least partly in the hollow section, and at least partly protruding from the hollow section, wherein the spring is positioned between the lever and bottom wall and provides upward pressure in the lever, and wherein the foot is essentially independent of biasing action from the spring, the foundation means includes interengaging spoke means detachably connecting the legs to the foundation means.

2. A support as claimed in claim 1 wherein the foot is extended by the application of downward pressure to the top of the foot, and the foot is withdrawn by application of downward pressure on the extending portion of the lever.

3. A support as claimed in claim 1 wherein the lever is at least partly L-shaped and wherein one end of the lever engages the inside of the leg.

4. A support as claimed in claim 1 wherein the legs include an aperture spaced from an end of the respective legs, and wherein the spoke means includes spokes with respective buttons biased to protrude outwardly such that in an outward position the spokes interengage with the aperture in the respective legs and secures the legs to the spokes.

* * * * *